(12) United States Patent
Nguyen

(10) Patent No.: US 11,071,280 B2
(45) Date of Patent: Jul. 27, 2021

(54) SYSTEM AND METHOD FOR PRODUCING TOY BALLS FOR PETS

(71) Applicant: Vung Van Nguyen, Ho Chi Minh (VN)

(72) Inventor: Vung Van Nguyen, Ho Chi Minh (VN)

(*) Notice: Subject to any disclaimer, the term of this patent is extended or adjusted under 35 U.S.C. 154(b) by 724 days.

(21) Appl. No.: 15/594,188

(22) Filed: May 12, 2017

(65) Prior Publication Data

US 2018/0153139 A1 Jun. 7, 2018

(30) Foreign Application Priority Data

Dec. 2, 2016 (VN) .............................. 1-2016-04729

(51) Int. Cl.
| | |
|---|---|
| *A01K 15/02* | (2006.01) |
| *A63B 39/00* | (2006.01) |
| *B29C 45/26* | (2006.01) |
| *B29D 22/04* | (2006.01) |
| *A63B 45/00* | (2006.01) |
| *A63B 43/00* | (2006.01) |
| *B29L 31/54* | (2006.01) |
| *B29C 45/00* | (2006.01) |
| *B29L 31/00* | (2006.01) |

(52) U.S. Cl.
CPC ............ *A01K 15/025* (2013.01); *A63B 39/00* (2013.01); *A63B 43/002* (2013.01); *A63B 45/00* (2013.01); *B29C 45/26* (2013.01); *B29D 22/04* (2013.01); *A63B 2039/003* (2013.01); *A63B 2208/14* (2013.01); *B29C 45/0053* (2013.01); *B29L 2031/54* (2013.01); *B29L 2031/7734* (2013.01)

(58) Field of Classification Search
CPC ...... A01K 15/02; A01K 15/025; A63B 39/00; A63B 43/002; A63B 45/02; A63B 2039/003; A63B 2208/14; B29D 22/04
USPC .................................................. 119/702, 707
See application file for complete search history.

(56) References Cited

U.S. PATENT DOCUMENTS

| | | | | |
|---|---|---|---|---|
| 4,884,807 A | * | 12/1989 | Welch .................... | A63B 43/00 473/575 |
| 5,965,182 A | * | 10/1999 | Lindgren ............. | A01K 15/026 426/104 |
| D424,256 S | * | 5/2000 | Lindgren ..................... | D21/714 |
| 7,914,405 B1 | * | 3/2011 | Scheffler ............. | A01K 15/026 119/707 |
| 2006/0137624 A1 | * | 6/2006 | Lamstein ............. | A01K 15/025 119/711 |
| 2012/0035007 A1 | * | 2/2012 | Sanna .................... | A63B 43/00 473/575 |
| 2013/0115400 A1 | * | 5/2013 | Chou ................... | A01K 15/025 428/36.8 |
| 2016/0029597 A1 | * | 2/2016 | Gratza ................. | A01K 15/025 119/707 |

* cited by examiner

*Primary Examiner* — Lisa L Tsang
(74) *Attorney, Agent, or Firm* — Foley & Lardner LLP

(57) ABSTRACT

A method of producing toy balls for pets, including: manufacturing distorted sphere balls with an opening in the distorted area using injection molding; sealing the opening of the distorted sphere balls to form uni-body sphere-shaped balls. The material used in the production of these toys can be rubber, thermoplastic elastomers, or thermoplastic rubber. This method allows to manufacture toy balls with no detached parts in the case of broken joints when the balls are chewed or torn apart by the pets. Thus, the ball can help to keep the pets from endangering themselves by swallowing detached parts of pet toy balls.

1 Claim, 5 Drawing Sheets

SYSTEM AND METHOD FOR PRODUCING TOY BALLS FOR PETS

CROSS-REFERENCE TO RELATED APPLICATION

This patent application claims priority to Vietnamese Patent Application Number 1-2016-04729, filed Dec. 2, 2016, naming inventor Vung Van Nguyen, and entitled "Phương pháp sản xuất bóng đồ chơi cho thú cưng" which is translated "Method of Producing Toy Balls for Pets," which is incorporated by reference in its entirety for all purposes.

FIELD

The invention relates to the manufacture of toy balls for pets, in particular, dog toy balls. The material used in the production of these toys can be rubber, thermoplastic elastomers, or thermoplastic rubber.

BACKGROUND

Dog owners want their pets to play outdoors because most healthy domestic dogs love to play with toys in an outdoor environment. Outdoor activities are also good for the health of the animals. Among outdoor activities, dogs particularly enjoy round-shaped toys such as balls.

Some of the known problems of toy balls for dogs are that they are not durable and not scratch resistant. Therefore, a toy ball has special value for the dogs and their owners when they meet the following criteria: high durability, scratch resistance; outside shape and structure allow the ball to roll freely on various surfaces such as grass, sand, concrete, etc.; low weight so that the dogs can easily catch and carry the ball. These criteria are essential for an optimal outdoor play experience for the dogs.

A popular method of producing toy balls is presented in FIG. 1: a hollow sphere-shaped body (1), manufactured by a molding method, with a hole that allows a cap (2) to be fitted in place. Cap (2) is then firmly attached to body (1) with glue.

Another alternative method is shown in FIG. 2: two hemispherical-shaped bodies, manufactured by a molding method, are attached to each other with glue.

The two mentioned methods have one common point: the toys are constructed from two molded parts and fixed together with glue. The disadvantage of these toys is that the joints between the two parts are usually the weakest part of the toy, and can be broken when the dogs play, chew or try to tear apart the ball. The result is that the toy can break into two detached parts and the dogs can swallow these parts (e.g. the cap or the hemispherical body), thus endanger themselves.

Background of Invention: The purpose of the invention is to manufacture a hollow toy ball for pets with only one component to avoid the possibility of detached parts which can lead to safety risks for pets as described above.

To achieve this purpose, the invention proposes a method for producing pet toy balls comprising:
  manufacture a distorted sphere ball with an opening on the distorted area using the injection molding method
  seal the opening by gluing welding to form a uni-body ball.

SUMMARY

A pet toy is provided. The pet toy may include a unibody ball shell. The unibody shell may include a first region and a second region. The first region may include a partial sphere shape including a transition edge. The second region may include a shape extending from the transition edge of the first region.

In various embodiments, the second region is a non-spherical shape. In various embodiments, the non-spherical shape is an ovoid.

In various embodiments of the pet toy, the unibody shell is an open shell with a first opening extending from an interior void of the pet toy and through the unibody ball shell.

In further various embodiments of the pet toy, the first region is a solid body with no interior void, and the second region defines a first opening extending from an interior void of the second region and through the unibody ball shell.

Moreover, in additional various embodiments of the pet toy, the first region and the second region are a solid body with no interior void, and the second region defines a first opening extending from an exterior surface of the second region and inwardly into the solid body.

In yet further various embodiments of the pet toy, the unibody ball shell is a closed shell with no openings.

In still additional embodiments of the pet toy, the second region defines a first opening extending from an interior void of the pet toy and through the unibody ball shell. The first opening may be a linear slit. The linear slit may lie within a single plane extending through a center of the first region. The single plane may define a cross-section of the pet toy oriented to bisect two identical hemispheres of the unibody ball shell. The linear slit may transit an outermost distal point of the second region as measured from the center of the first region.

The first opening including the linear slit may include a first lip, a second lip, and a sealing joint affixing the first lip to the second lip along at least a portion of a length of the linear slit. The sealing joint may include at least one of gluing and welding.

In various instances the second region includes a spherical shape having at least one of a different radius than the first region and a different center than the first region.

A pet toy manufacturing mold is provided. The mold may have a first mold portion having a profile corresponding to a first surface portion of a pet toy, a second mold portion joinable to the first mold portion and having a profile corresponding to a second surface portion of the pet toy, and a core mold embraced between the first mold portion and the second mold portion and having a profile corresponding to an interior void of the pet toy.

The core mold may also have a handle configured to create a first opening extending from the interior void of the pet toy manufactured in the pet toy manufacturing mold and through a union of the first surface portion of the pet toy and the second surface portion of the pet toy.

The first surface portion of the pet toy and the second surface portion of the pet toy may be identical hemispheres of the pet toy. A cross-section of the first surface portion of the pet toy and a cross-section of the second surface portion of the pet toy may be identical and each may include an ovoid.

In various instances of the pet toy manufacturing method, the pet toy is disposed between the core mold and the first and second mold portions by injection molding. The pet toy may include a unibody ball shell with a first region corresponding to a first part of the first mold portion and a first part of the second mold portion and a second region corresponding to a second part of the first mold portion and a second part of the second mold portion. The first region may have a partial sphere shape including a transition edge. The second region may have a shape extending from the transition edge of the first region. The second region defines the first opening extending from the interior void of the pet toy and through the unibody ball shell. The first opening may include a linear slit. The linear slit may lie within a single plane extending through the center of the first region. The single plane may define a cross-section of the pet toy oriented to bisect two identical hemispheres of the unibody ball shell and the single plane may define the union of the first mold portion and the second mold portion. The linear slit may transit an outermost distal point of the second region as measured from a center of the first region.

In various instances of the pet toy manufacturing method, the linear slit includes a first lip, a second lip, and a sealing joint affixing the first lip to the second lip along at least a portion of the length of the linear slit. The sealing joint may include at least one of gluing and welding. The shape of the second region may include an ovoid.

A method of making a pet toy is provided. The method may include providing a unibody ball shell having a first region and a second region, wherein the first region is a partial sphere shape including a spherical-to-non-spherical transition edge, wherein the second region is a non-spherical shape extending from the spherical-to-non-spherical transition edge of the first region.

The method of making the pet toy may also include providing a first opening. The second region including the non-spherical shape defines the first opening extending from an interior void of the pet toy and through the unibody ball shell, the first opening includes a linear slit, the linear slit lies within a single plane extending through the center of the first region, and the single plane defines a cross-section of the pet toy oriented to bisect two identical hemispheres of the unibody ball shell. Moreover, at least a portion of the linear slit is positioned at an outermost distal point of the second region as measured from a center of the first region.

The method of making the pet toy may also include wherein providing the unibody ball shell includes injection molding the unibody ball shell in a pet toy manufacturing mold. The mold may include a first mold portion having a profile corresponding to a first surface portion of a pet toy, a second mold portion joinable to the first mold portion and having a profile corresponding to a second surface portion of the pet toy, and a core mold embraced between the first mold portion and the second mold portion and having a profile corresponding to the interior void of the pet toy.

The method of making the pet toy may also include wherein providing the first opening includes injection molding the unibody ball shell in the pet toy manufacturing mold. The core mold may include a handle configured to create the first opening extending from the interior void of the pet toy manufactured in the pet toy manufacturing mold through a union of the first surface portion of the pet toy and the second surface portion of the pet toy. In various instances, the first surface portion of the pet toy and the second surface portion of the pet toy are identical hemispheres of the pet toy and a cross-section of the first surface portion of the pet toy and a cross-section of the second surface portion of the pet toy are identical and include an ovoid.

The method of making the pet toy may include providing a sealing joint of the first opening. In various instances, at least a portion of the first opening is positioned at an outermost distal point of the second region as measured from a center of the first region. In various instances, the linear slit includes a first lip, and a second lip parallel to the first lip. In various instances, the sealing joint affixes the first lip to the second lip along at least a portion of a length of the linear slit.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1:
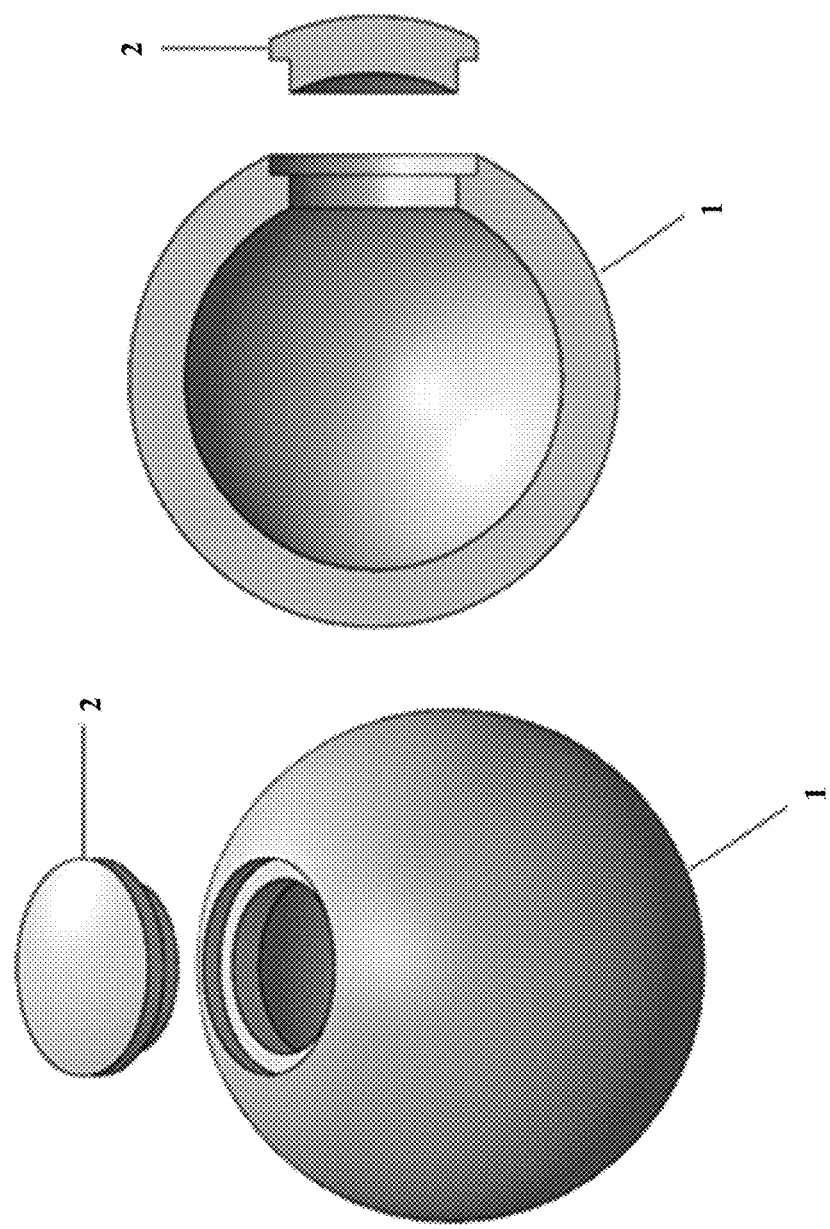
FIG. 1 presents a known method of producing toy balls.
Figure 2:
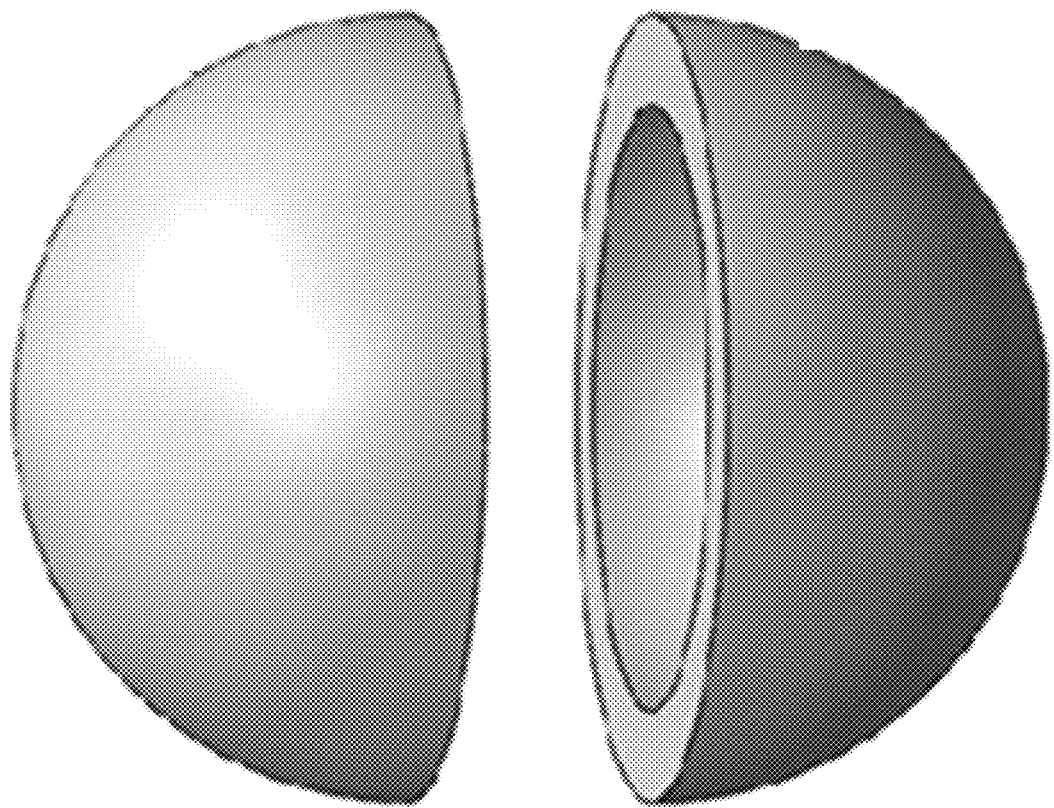
FIG. 2 presents another known method of producing toy balls.
Figure 3:
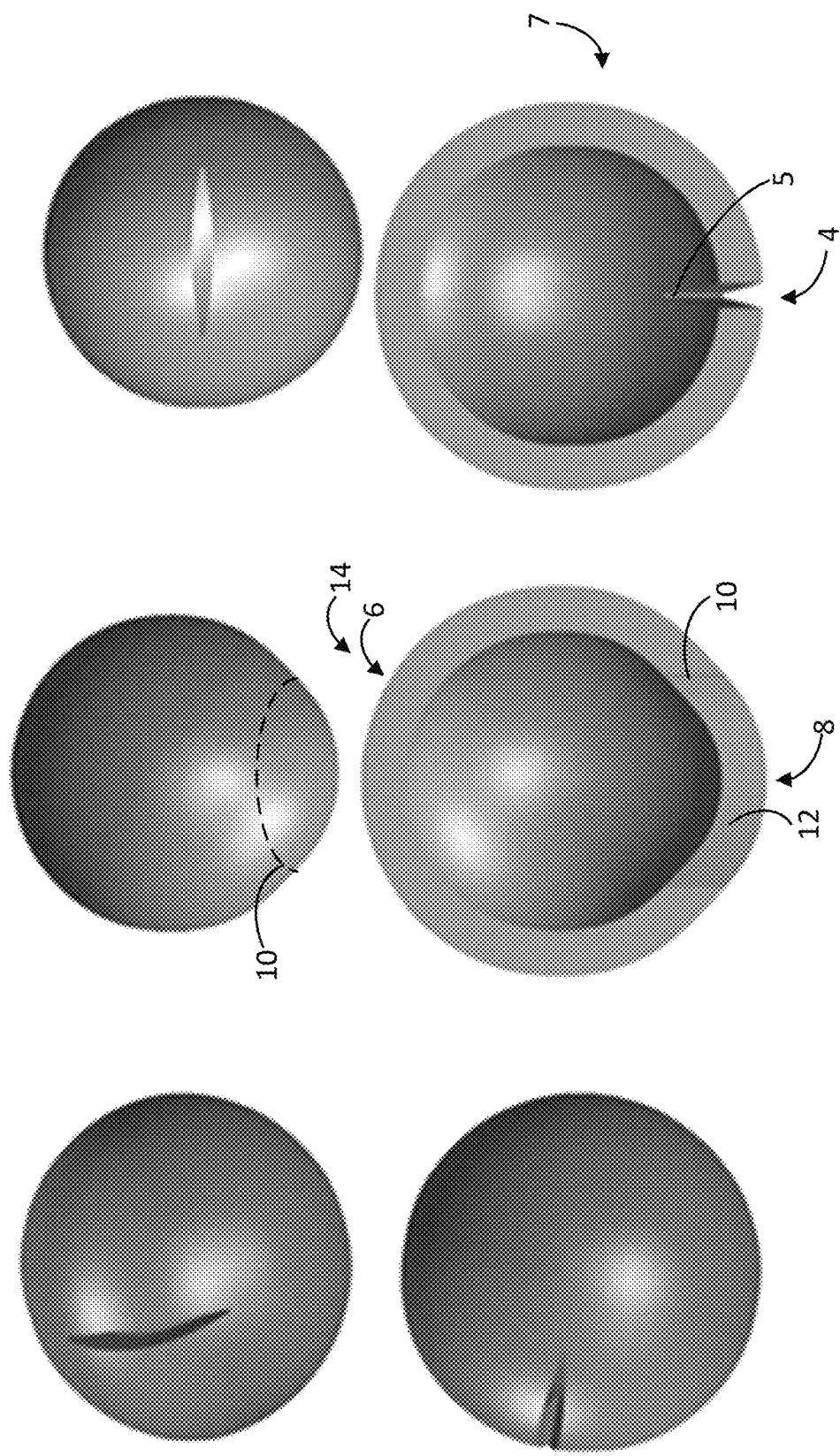
FIG. 3 presents various perspectives of the toy ball manufactured by the method of the invention before the gap being sealed.

Referring to FIG. 3, the invention proposes a method of producing toy balls for pets including:
 manufacture a distorted sphere ball 7 with an opening 4 (slit 5) on the distorted area (second region 8) using injection molding;
 seal the opening by gluing welding to form a uni-body ball without openings 14.

The material used in the production of these toys can be rubber, thermoplastic elastomers, or thermoplastic rubber.

Figure 4:
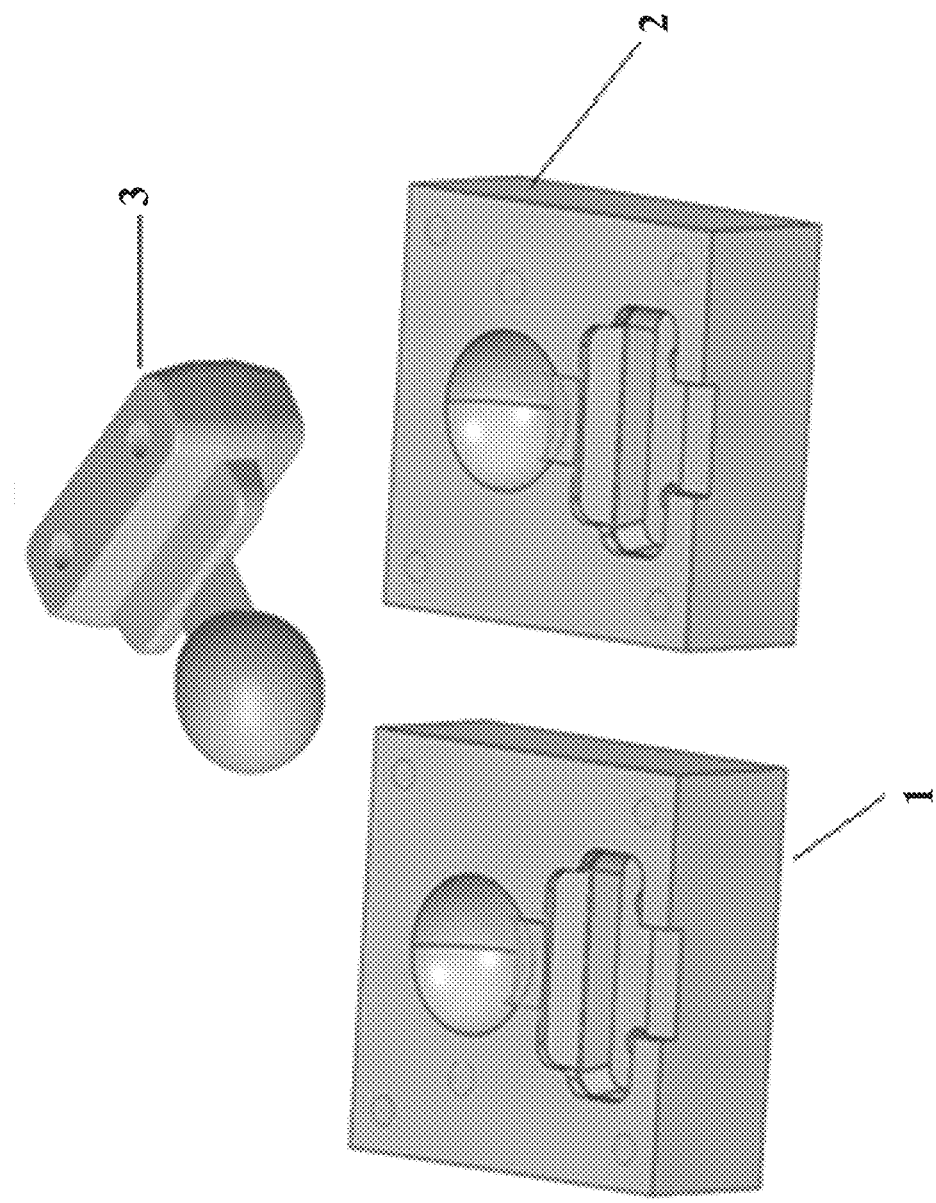
FIG. 4 presents the shape and structure of a mold that can be used for the method of the invention.

In order to achieve the above-mentioned method, the invention should employ an injection mold with the structure illustrated in FIG. 4. The male mold 1 and the female mold 2 embrace the core mold 3. The core mold 3 has dedicated handle allows create the opening on the molded product. The semi-finished product is created by injection molding using these three molds. The opening 4 (FIG. 3) will then be sealed to form a round ball shape 14 (FIG. 3) as required.

Figure 5:
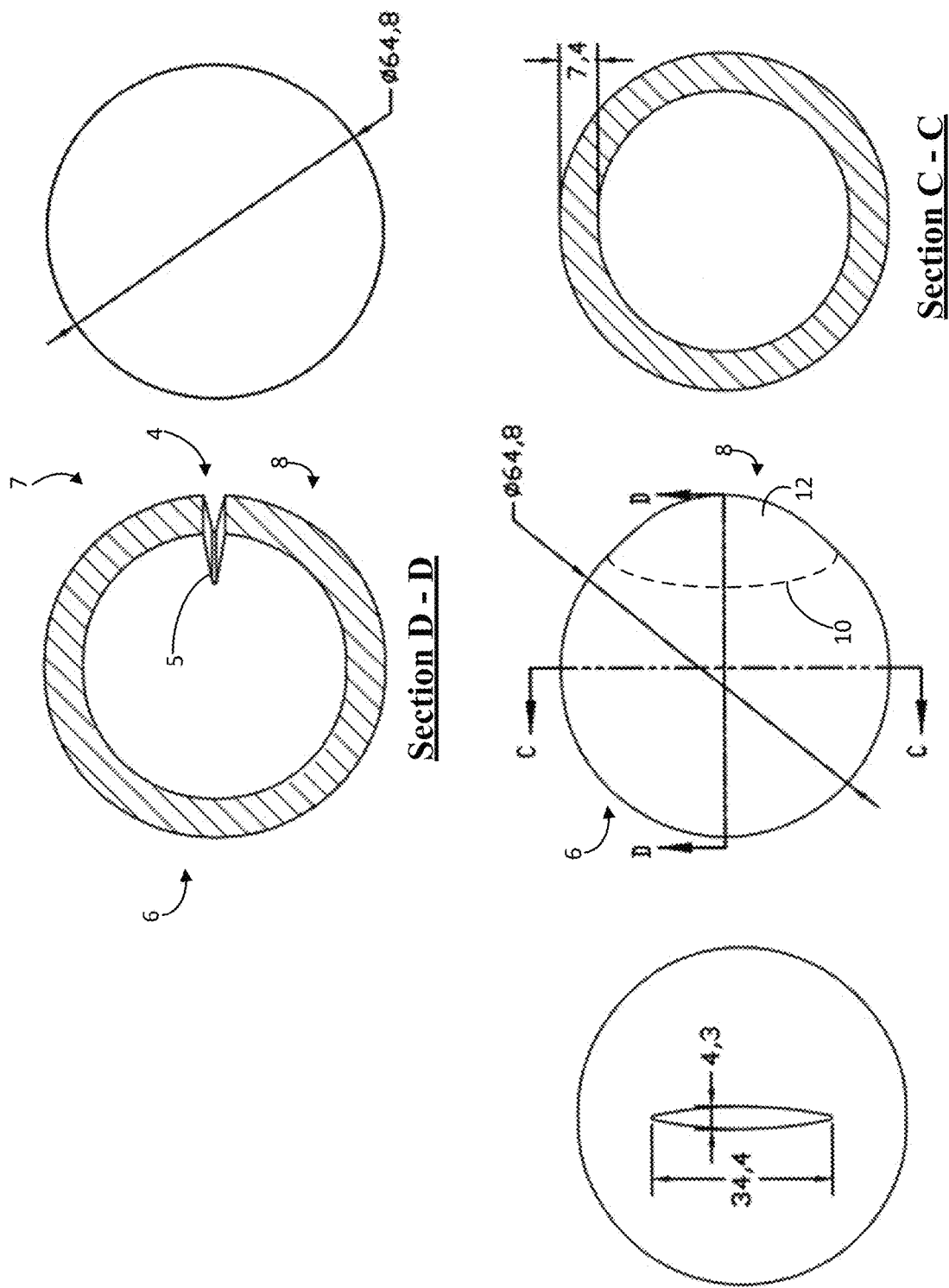
FIG. 5 presents the shape and the dimensions of the toy ball as an example of implementation of the invention.

Example of Implementation: FIG. 5 illustrates a hollow uni-body ball 7 made from rubber. The thickness of the rubber wall is 7.4 mm. The diameter of the ball is 64.8 mm. The length of the opening is 34.4 mm and the widest gap of the opening is 4.3 mm.

Step 1: injection molding a distorted sphere ball 7 ($1^{st}$ region 6 & $2^{nd}$ region 8 encompassing transition edge 10) with an opening 4 (slit 5) on the distorted (shape 12) area 8 using molds illustrated in FIG. 4;

Step 2: sealing the opening 4 to create a uni-body sphere-shaped ball 14.

Effectiveness of the invention: The invention allows to manufacture hollow uni-body toy balls which can help to avoid the possibility of detached parts which can lead to safety risks for pets in the case of broken glued joints when the balls are chewed or torn apart by the pets.

A method of producing toy balls for pets includes
 manufacture a distorted sphere ball 7 with an opening 4 on the distorted area 8 using injection molding;
 seal the opening 4 by gluing welding to form a uni-body sphere-shaped ball 14.

The method of producing toy balls also includes, wherein the balls are made from rubber, thermoplastic elastomers, or thermoplastic rubber.

The invention claimed is:
1. A pet toy comprising:
a unibody ball shell comprising a first region and a second region,
wherein the first region comprises a partial sphere shape including a transition edge,
wherein the second region comprises a shape extending from the transition edge of the first region,
wherein the second region defines a first closure of an interior void of the second region of the unibody ball shell,
wherein the first closure comprises a sealing joint affixing a slit bounded by a first curved lip and a second curved lip joining at opposite vertices along a length on the second region, wherein the sealing joint affixes the slit closed by affixing the first curved lip to the second curved lip along at least a portion of the length of the slit,
wherein a curvature of the first curved lip and a curvature of the second curved lip are both at least partially flattened to be at least partially linear along the sealing joint, in response to the affixing,
wherein at least a portion of the sealing joint affixing the slit is positioned at an outermost distal point of the second region as measured from the center of the first region,
wherein the vertices lie within a single plane that extends through a center of the first region,
wherein the single plane defines a cross-section of the pet toy oriented to bisect two identical hemispheres of the unibody ball shell, and
wherein the second region comprises a spherical shape having a different radius than the first region.

* * * * *